(12) United States Patent
Ionescu

(10) Patent No.: US 11,687,649 B2
(45) Date of Patent: *Jun. 27, 2023

(54) SECURELY AND EFFICIENTLY PROVIDING USER NOTIFICATIONS ABOUT SECURITY ACTIONS

(71) Applicant: Crowdstrike, Inc., Irvine, CA (US)

(72) Inventor: Ion-Alexandru Ionescu, Seattle, WA (US)

(73) Assignee: Crowdstrike, Inc., Irvine, CA (US)

( * ) Notice: Subject to any disclaimer, the term of this patent is extended or adjusted under 35 U.S.C. 154(b) by 354 days.

This patent is subject to a terminal disclaimer.

(21) Appl. No.: 17/008,038

(22) Filed: Aug. 31, 2020

(65) Prior Publication Data

US 2020/0394297 A1 Dec. 17, 2020

Related U.S. Application Data

(63) Continuation of application No. 15/951,025, filed on Apr. 11, 2018, now Pat. No. 10,762,202.

(51) Int. Cl.
| | |
|---|---|
| *G06F 21/00* | (2013.01) |
| *G06F 21/55* | (2013.01) |
| *G06F 9/54* | (2006.01) |
| *G06F 21/33* | (2013.01) |
| *G06F 21/56* | (2013.01) |

(52) U.S. Cl.
CPC ............ *G06F 21/554* (2013.01); *G06F 9/545* (2013.01); *G06F 9/547* (2013.01); *G06F 21/33* (2013.01); *G06F 21/566* (2013.01)

(58) Field of Classification Search
CPC ........ G06F 21/554; G06F 9/545; G06F 9/547; G06F 21/33; G06F 21/566
See application file for complete search history.

(56) References Cited

U.S. PATENT DOCUMENTS

| | | | |
|---|---|---|---|
| 6,789,251 B1 * | 9/2004 | Johnson | G06F 9/451 717/100 |
| 7,665,139 B1 | 2/2010 | Szor et al. | |
| 7,681,237 B1 | 3/2010 | Spiegel et al. | |

(Continued)

OTHER PUBLICATIONS

The Extended European Search Report dated Aug. 9, 2019, for European Application No. 19166010.9, 5 pages.

(Continued)

*Primary Examiner* — Ghodrat Jamshidi
(74) *Attorney, Agent, or Firm* — Lee & Hayes, P.C.

(57) ABSTRACT

A security agent executing in kernel mode may receive a request from the anti-malware component executing with low privileges in user mode, and, in response, the security agent may perform a security action with respect to a malicious file detected on the computing device. The security agent may then assist the anti-malware component in providing a user notification about the security action by obtaining, on behalf of the anti-malware component, a user token associated with the user session in which the malicious file was detected. The anti-malware component can use the obtained user token to request a pointer to a Component Object Model (COM) interface for outputting the notification in context of the appropriate user session, which allows for securely and efficiently providing the user notification.

20 Claims, 5 Drawing Sheets

(56) References Cited

U.S. PATENT DOCUMENTS

| | | | |
|---|---|---|---|
| 7,702,906 B1* | 4/2010 | Karr | H04L 67/10 |
| | | | 713/164 |
| 2005/0149726 A1 | 7/2005 | Joshi et al. | |
| 2005/0246522 A1 | 11/2005 | Samuelsson et al. | |
| 2006/0259487 A1 | 11/2006 | Havens et al. | |
| 2007/0038986 A1* | 2/2007 | Houser | G06F 9/4486 |
| | | | 712/E9.083 |
| 2008/0083030 A1* | 4/2008 | Durham | G06F 8/656 |
| | | | 726/22 |
| 2009/0328180 A1 | 12/2009 | Coles et al. | |
| 2011/0239298 A1 | 9/2011 | Burtscher | |
| 2014/0007139 A1 | 1/2014 | Janssen et al. | |
| 2014/0059226 A1* | 2/2014 | Messerli | H04L 67/51 |
| | | | 709/226 |
| 2014/0104287 A1 | 4/2014 | Nalluri et al. | |
| 2016/0352665 A1* | 12/2016 | Nielsen | H04L 67/10 |
| 2017/0070479 A1* | 3/2017 | Menezes | H04L 12/1822 |
| 2017/0090821 A1 | 3/2017 | Woodward et al. | |
| 2017/0118215 A1* | 4/2017 | Varadarajan | H04L 63/10 |
| 2018/0018459 A1* | 1/2018 | Zhang | G06F 21/566 |
| 2018/0198824 A1* | 7/2018 | Pulapaka | G06F 9/455 |
| 2019/0268152 A1 | 8/2019 | Sandoval et al. | |
| 2019/0318084 A1 | 10/2019 | Ionescu | |

OTHER PUBLICATIONS

The Extended European Search Report dated Jan. 11, 2021 for European Patent Application No. 20201760.4, 6 pages.

* cited by examiner

SECURELY AND EFFICIENTLY PROVIDING USER NOTIFICATIONS ABOUT SECURITY ACTIONS

CROSS REFERENCE TO RELATED APPLICATION

This patent application is a continuation of and claims priority to co-pending and co-owned U.S. patent application Ser. No. 15/951,025, filed Apr. 11, 2018, entitled "SECURELY AND EFFICIENTLY PROVIDING USER NOTIFICATIONS ABOUT SECURITY ACTIONS," which is hereby incorporated in its entirety by reference.

BACKGROUND

With Internet use forming an ever greater part of day to day life, security exploits that steal or destroy system resources, data, and private information are an increasing problem. Governments and businesses devote significant resources to preventing intrusions and thefts related to these security exploits. Security exploits, sometimes referred to as "malware," come in many forms, such as computer viruses, worms, trojan horses, spyware, keystroke loggers, adware, and rootkits. These exploits are delivered in or through a number of mechanisms, such as spearfish emails, clickable links, documents, files, executables, or archives. Some of the threats posed by security exploits are of such significance that they are described as cyber terrorism or industrial espionage.

To aid in countering such threats, anti-virus software can employ a user-mode component to scan files and perform a security action with respect to a malicious file when malware is detected. For example, when a user tries to open a malicious file, anti-virus software may not allow the malicious file to be opened by blocking a process to open the file. In this situation, a notification can be provided to the user in order to inform the user that a security action was taken (e.g., a notification that a file access request was blocked in order to protect system resources). Existing techniques for providing such user notifications come with several problems.

For example, existing techniques for providing user notifications can create high overhead in terms of the amount of system resources consumed on a monitored device. For instance, vendors of anti-virus software may write code to create a user-mode process (e.g., a notify .exe process) that is to run inside a user session when a security action has been performed with respect to a detected malicious file. This user-mode process may cause a pop-up notification to be displayed in context of the user session. This technique creates a user-mode process for every security action performed by the anti-virus software, which can stress resources on the monitored device. Imagine a scenario where hundreds of users are logged into hundreds of corresponding user sessions on a monitored device, and each user tries to access a malicious file. In this scenario, there can be hundreds of concurrently executing user-mode processes for displaying user notifications about security actions taken with respect to the detected malicious files, which can consume a high amount of system resources.

Other problems with existing approaches pertain to security and privacy concerns. Oftentimes, anti-virus software executes in user mode with high privileges (e.g., Administrator (Admin) privileges or higher) in order to access system resources and data it needs in order to effectively counter threats posed by malware. This means that user-mode processes created by the anti-virus software may share the same high privileges, leaving valuable system resources vulnerable to theft or destruction if and when such processes are exploited with malware. Although some operating systems allow anti-virus software to utilize special functions to create user mode processes with lower privileges, this often involves the anti-virus software impersonating a user account, something that is exclusively available to highly-privileged software. Thus, valuable system resources are still vulnerable to theft or destruction if and when the highly-privileged anti-virus software is exploited with malware. Moreover, impersonating a user account introduces additional privacy concerns because the anti-virus software is given the power to create processes on the system that appear as though they were created by a particular user, even though they weren't. If it just so happened that these processes accessed files that the user is not allowed to access (such as illegal access of files/content), event and audit logs will show that the user himself/herself accessed those files, when, in fact, he/she did not.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
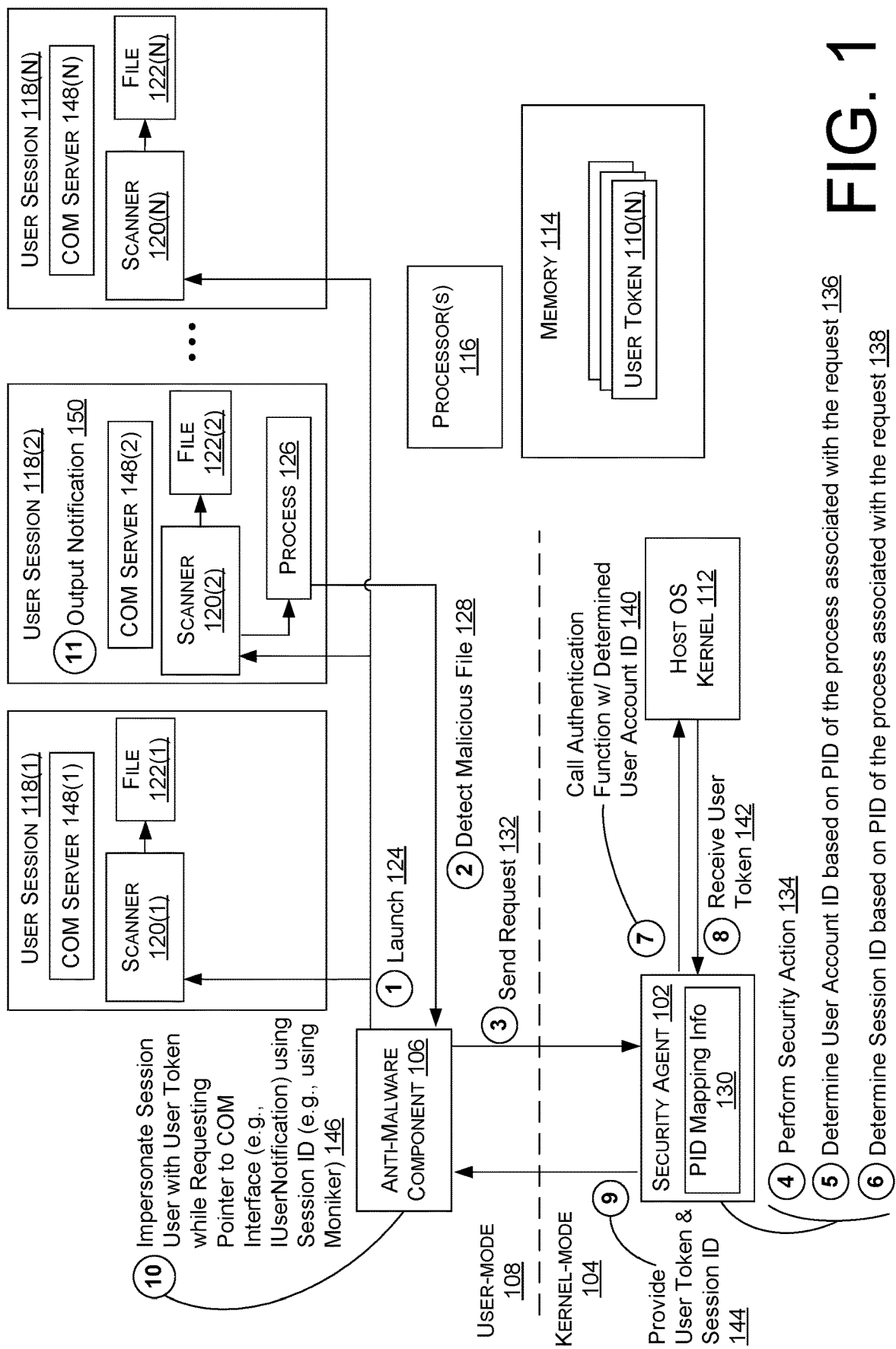
FIG. 1 illustrates an overview of multiple executable components of a computing device, the multiple executable components including a security agent in kernel mode and a low-privileged anti-malware component in user mode. The security agent is configured to obtain a user token, and pass the user token to the anti-malware component so that the anti-malware component can use the obtained user token to implement a Component Object Model (COM) interface for outputting a user notification about a security action taken with respect to a detected malicious file.

This disclosure describes, in part, techniques and systems for securely and efficiently providing user notifications about security actions performed with respect to malicious files detected on a computing device. An anti-malware component executing in user mode of the computing device is configured to implement a Component Object Model (COM) interface to provide such user notifications. Implementing a COM interface eliminates the need to create user mode processes to provide such user notifications, thereby improving efficiency of the computing device by reducing the number of user mode processes executing on the computing device at a given time. This also alleviates the privacy concerns mentioned above because the anti-malware component is not creating user mode processes that appear as though they were created by a user; it is instead implementing a COM interface that does not involve the creation of user mode processes.

The anti-malware component is further configured to execute in user mode with low privileges (e.g., less than Administrator (Admin) privileges) by leveraging a security agent in kernel mode of the computing device to assist with the implementation of the COM interface so that user notifications can be provided by the anti-malware component within the appropriate user session. Specifically, the kernel mode security agent is used to obtain a user token corresponding to a user account identifier (ID) of the user session in which a malicious file was detected. This user token can be used by the anti-malware component to impersonate the user associated with the appropriate user session while requesting a pointer to the COM interface, which allows the anti-malware component to pass a security descriptor that specifies who is allowed to request the pointer to the COM interface for the particular user session. By executing the anti-malware component with low privileges in user mode, exploitation of valuable system resources is prevented, thereby improving security on the computing device, as compared to existing approaches for providing user notifications regarding security actions.

An example process to securely and efficiently provide user notifications about security actions may include a kernel mode security agent receiving a request from an anti-malware component executing in user mode of a computing device, and, in response, performing a security action with respect to a malicious file detected on the computing device by the anti-malware component. The kernel mode security agent may then assist the anti-malware component in providing a notification to a user to inform the user that the security action was performed. The kernel mode security agent provides this assistance by obtaining a user token associated with the user session in which the malicious file was detected, and providing the user token to the anti-malware component. In order to obtain the correct user token, the security agent may, in some embodiments, determine a process identifier (PID) of a process associated with the request from the anti-malware component (e.g., a process that was created in the user session in which the malicious file was detected to notify the anti-malware component about the malicious file). The anti-malware component can use the obtained user token to request a pointer to a COM interface for outputting the notification in context of the appropriate user session, which notification can be output via an output device of the computing device so that the user is informed that the security action was performed.

Also described herein are systems and devices comprising one or more processors and one or more memories, as well as non-transitory computer-readable media storing computer-executable instructions that, when executed, by one or more processors perform various acts and/or processes disclosed herein.

FIG. 1 illustrates an overview of multiple executable components of a computing device. The multiple executable components may include, without limitation, a security agent 102 in kernel mode 104 of the computing device and an anti-malware component 106 in user mode 108 of the computing device. The security agent 102 may be configured to receive a request from the anti-malware component 106, and respond to the request by obtaining a user token 110 that is used by the anti-malware component 106 to cause a notification to be output on the computing device in context of a user session in which a malicious file was detected.

As illustrated, a computing device includes components implemented at the kernel-level (or in kernel mode 104), such as the security agent 102 and a host operating system (OS) kernel 112. The computing device also includes components implemented at the user-level (or in user mode 108), such as the anti-malware component 106. The anti-malware component 106 may be associated with the security agent 102 as part of a comprehensive security service, and the anti-malware component 106 may be configured to communicate with (e.g., send data/signals/messages to, and receive data/signals/messages from) the security agent 102.

Additionally, the computing device may have a memory 114 and a processor(s) 116. The memory 114 may store one or more of the executable components shown in FIG. 1, as well as other executable instructions that, when executed by the processor(s) 116, cause the computing device to perform the techniques described herein. FIG. 1 also shows multiple user tokens 110(1)-(N) (collectively 110) stored in the memory 114. Each user token 110 may correspond to a particular user session of multiple user sessions 118(1)-(N) (collectively 118) that may be associated with users who are using the computing device at any given time. As shown in FIG. 1, the computing device may support multiple concurrent user sessions 118, but the techniques and systems described herein can be utilized with respect to a single user session 118.

The processor(s) 116 may be any sort of processor(s), such as a central processing unit (CPU), a graphics processing unit (GPU), or both CPU and GPU, or other processing unit(s) or component(s) known in the art. Additionally, the processor(s) 116 may support hardware-based virtualization (such as Intel™ VT-x) with second level address translation (SLAT).

Figure 2:
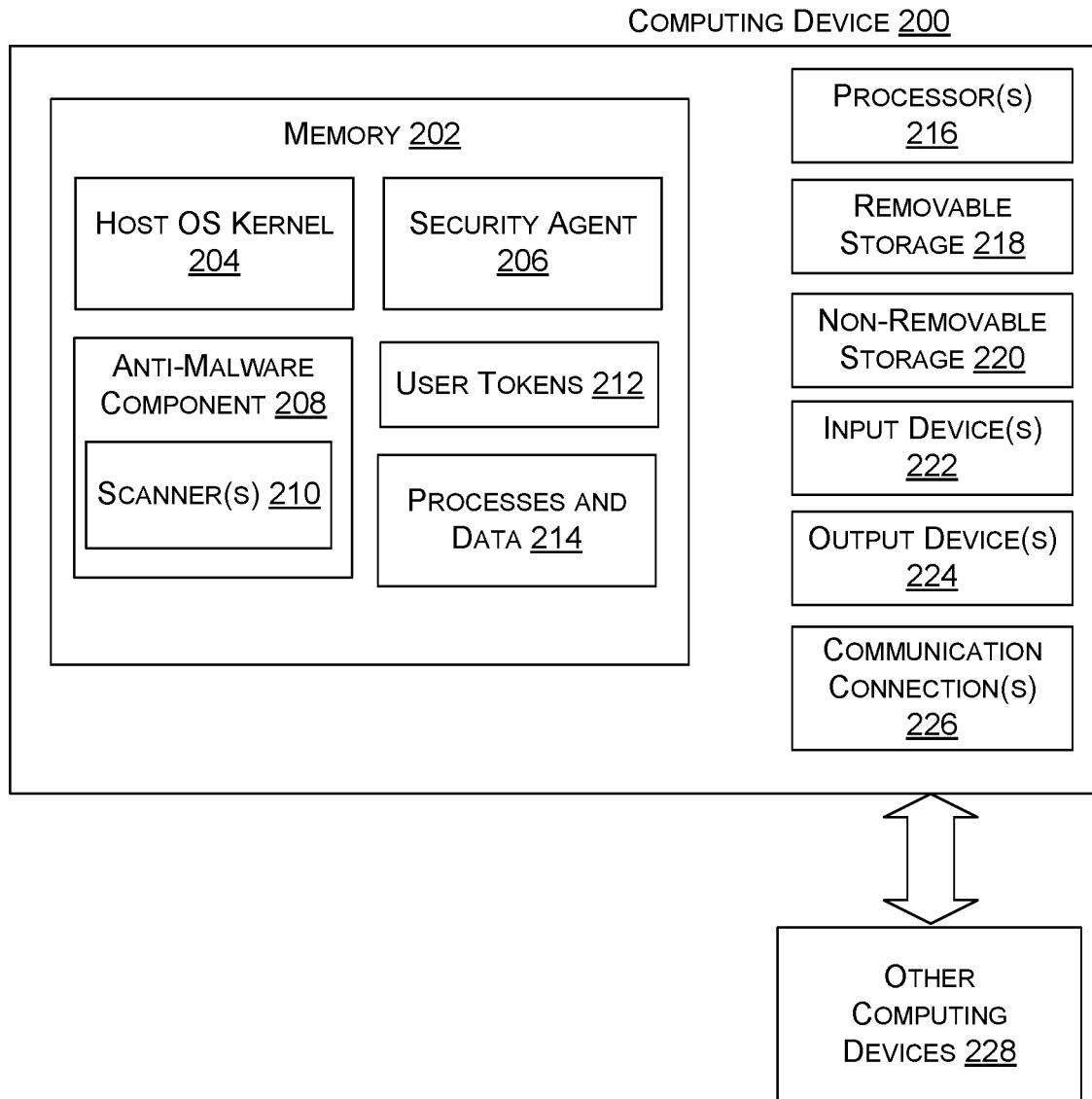
FIG. 2 illustrates a component level view of a computing device configured with a security agent and an anti-malware component to implement the techniques described herein for securely providing user notifications.

In various embodiments, a computing device may include the OS kernel 112, security agent 102, anti-malware component 106, processor(s) 116, and memory 114. Such a computing device may be a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. When implemented on multiple computing devices, the OS kernel 112, security agent 102, anti-malware component 106, processor(s) 116, and memory 114 may be distributed among the multiple computing devices. In some implementations, the computing device represents one or more virtual machines implemented on one or more computing devices. An example of a computing device including the OS kernel 112, security agent 102, anti-malware component 106, processor(s) 116, and memory 114 is illustrated in FIG. 2 and described below with reference to that figure.

The OS kernel 112 may be a kernel of any sort of OS, such as a Windows® OS, a Unix OS, or any other sort of OS. Other OSes, referred to as "guest" OSes, may be implemented in virtual machines supported by the host OS. The host OS kernel 112 may provide access to hardware resources of the computing device, such as the memory 114 and processor(s) 116 for other processes of the computing device.

The computing device may implement multiple protection rings or privilege levels which provide different levels of access to system resources. For example, the user-level (or user mode 108) may be at an "outer" ring or level, with the least access (e.g., "ring 3"), and the kernel-level (or kernel mode 104) may be at an "inner" ring or level, with greater access (e.g., "ring 0" or "ring 1") than the user-level 108. There may be one or more additional rings or levels (e.g., "ring −1") with even greater access than the user or kernel level shown in FIG. 1.

The security agent 102 may be a kernel-level security agent, which may, among other things, monitor and record activity on the computing device, may analyze the activity, and may generate alerts and events and provide those alerts and events to a remote security service. The security agent 102 may be installed by and configurable by the remote security service, receiving, and applying while live, configurations of the security agent 102 and its component(s), such as the anti-malware component 106. An example security agent 102 is described in greater detail in U.S. patent application Ser. No. 13/492,672, entitled "Kernel-Level Security Agent" and filed on Jun. 8, 2012, which issued as U.S. Pat. No. 9,043,903 on May 26, 2015. As is described further herein, the security agent 102 is configured to, among other things, assist the anti-malware component 106 in obtaining a user token 110 so that the anti-malware component 106 can execute with low privileges (e.g., privileges that are more restrictive than Administrator (Admin) privileges) while requesting a pointer to a COM interface. The pointer to the COM interface can be used to call a method of the COM interface to cause output of a notification in context of a user session in which a malicious file was detected.

In various implementations, the anti-malware component 106 may be a component of the security agent 102 that is executed in user mode 108 of the computing device. In some implementations, the anti-malware component 106 is configured to operate as an antivirus component. The anti-malware component 106 may run in the background to orchestrate or coordinate the launching of one or more scanners 120(1)-(N) (collectively 120). The scanners 120 are sometimes referred to herein as "anti-malware scanners" 120 or "antivirus scanners" 120. The scanners 120 are individually configured to perform security assessment functions with respect to files, and/or other data objects, associated with corresponding user sessions 118. Security assessment functions performed by the scanners 120 may include, without limitation, scanning, analyzing, observing, and/or assessing any suitable type of data object, including files, on the computing device. Hereafter, the term "scan," or variants thereof, may refer to any of the aforementioned security assessment functions. In various implementations, the anti-malware component 106 (and the associated scanners 120) may operate using signature or fingerprint databases to detect malware variants associated with files on the computing device. Such databases can be stored locally on the computing device, or they may be stored in the "Cloud" (at a remote computing device(s)) so that the computing device can free-up memory and perform cloud-based malware lookups to detect malicious files. Other malware detection methods known to a person having ordinary skill in the art are contemplated herein. The term "malware," may refer to any type of virus, worm, trojan horse, spyware, and/or any other type of exploit that may be contained in a malicious file.

FIG. 1 shows a first user session 118(1) having associated therewith a first scanner 120(1). The first user session 118(1) may be associated with a first user who is using the computing device (locally, or remotely via any suitable remote desktop access technology), and the anti-malware component 106 may launch the first scanner 120(1) to scan files, including the file 122(1), in context of the first user session 118(1). Likewise, FIG. 1 shows a second user session 118(2) and an associated second scanner 120(2) configured to scan files, including the second file 122(2), in context of the second user session 118(2). An $N^{th}$ user session 118(N) indicates that this can be done for any number of "N" user sessions 118. Thus, N scanners 120(1)-(N) may be concurrently executing on the computing device while users are accessing files 122, saving files 122 to memory 114, and/or performing other operations with respect to files 122 on the computing device.

The anti-malware component 106, like other OS-related services, may not be associated with a particular user or user session 118. Thus, the anti-malware component 106, as well as other OS-related services, may be associated with a "services" session (e.g., Session 0). The services session (or Session 0) may not be associated with a user interface on the computing device like the user sessions 118. Instead, the services session (or Session 0) may run in the background, without user interface functionality.

When launched by the anti-malware component 106, an individual scanner 120 may execute with low privileges (e.g., less than Admin privileges) inside a "sandbox" (or container), which is also launched by the anti-malware component 106. A "privilege(s)," as used herein, means a right(s) granted to a component, process, or thread executing on the computing device that gives the component, process, or thread access to particular system resources and/or the ability to perform particular system-related operations on the computing device, such as shutting down the system, loading device drivers, changing system settings, and the like. Thus, executing the scanners 120 with low privileges within a "sandbox" in user mode 108 may mean that the scanners 120 do not have the requisite privileges to perform some or all of these types of operations, making it difficult for malware to do anything useful in the event that an individual scanner 120 is exploited. For example, malware that successfully exploits a scanner 120 may be unable to exploit the anti-malware component 106 due to the low privileges, and the contained nature, of the scanner 120. The scanners 120 are executed in user mode 108 (as opposed to kernel mode 104, or another protection ring with greater access to system resources as compared to the user mode 108) because it is probable that the scanners 120 will eventually encounter malware while scanning files 122 on the computing device.

As shown in FIG. 1, the anti-malware component 106 may launch, at 124, one or more scanners 120 to scan files 122 in one or more user sessions 118. For example, a first user may be logged into the first user session 118(1), and a first scanner 120(1) launched by the anti-malware component 106 may execute in a low-privileged sandbox to scan a file 122(1), or multiple files. If a second user logs into a second user session 118(2), a second scanner 120(2) may be launched by the anti-malware component 106 to execute in a low-privileged sandbox to scan a file 122(2), or multiple files. This may occur for any number of "N" user sessions 118 and any number of files 122 in each user session 118.

At some point, a scanner 120 may detect a malicious file 122. FIG. 1 shows an example of this with respect to the second user session 118(2) whereby the scanner 120(2) detects a malicious file 122(2). For instance, a second user may have tried to access/open the file 122(2), or save the file 122(2) to disk, and the scanner 120(2) may have detected malware upon scanning the file 122(2) in response to the user taking such an action. In response, the scanner 120(2) may create a user mode process 126 in the user session 118(2) that is tasked with notifying the anti-malware component 106 about the detected malicious file 122(2), and, at 128, the process 126 may notify the anti-malware component 106 about the malicious file 122(2). The process 126 is assigned a process identifier (PID) when it is created in the user session 118(2). Meanwhile, the security agent 102 (in kernel mode 104) may be configured to track process creation events on the computing device and maintain PID mapping information 130 that maps PIDs of created processes (e.g., the process 126) to user account IDs (e.g., usernames, such as user principal names (UPNs)) associated with the created processes. The PID mapping information 130 may also map PIDs to session IDs of the user sessions 118 in which the processes were created. Thus, the PID mapping information 130 may map a user account ID and a session ID to the PID of the process 126, after the process 126 is created.

Once the process 126 notifies, at 128, the anti-malware component 106 about the malicious file 122(2), the anti-malware component 106 may send, at 132, a request to the security agent 102. The request sent at 132 may include the PID of the process 126, and, therefore, the process 126 may be associated with the request sent at 132. The request sent at 132 may cause the security agent 102 to perform, at 134, a security action with respect to the malicious file 122(2). For example, the security action performed at 134 by the security agent 102 may block the opening of the file 122(2), quarantine the file 122(2), or take some other type of security action with respect to the malicious file 122(2) to mitigate damage to, or theft of, system resources and/or data.

Performance of the security action at 134 may act as a trigger to provide a user notification indicating that the security action was performed. Accordingly, the security agent 102 may obtain a user token 110 that is usable by the anti-malware component 106 for implementing a COM interface to provide such notification. Leveraging the security agent 102 for this purpose allows the anti-malware component 106 to execute with low privileges (e.g., less than Admin privileges) in user mode 108, which, in turn, prevents theft or destruction of valuable system resources in the event that the anti-malware component 106 is compromised. Without the user token 110, the anti-malware component 106 may be unable to obtain a pointer to the COM interface because a security descriptor associated with the COM interface may specify that only the user of the user session 118(2), and possibly components with Admin privileges or higher, are authorized to obtain the pointer to the COM interface. Because the anti-malware component 106 executes with less-than Admin privileges, and because the anti-malware component 106 is not the user of the user session 118(2), it may be unable to obtain the pointer to the COM interface without the user token 110 associated with the user session 118(2).

Initially, in response to performance of the security action at 134, the security agent 102 may, at 136, determine a user account ID based at least in part on the PID of the process 126 associated with the request sent at 132 from the anti-malware component 106. The user account ID determined at 136 may comprise a username, such as a UPN, that can be used to call an authentication function that will return the correct user token 110 to the security agent 102. A UPN may be a user account name or ID that identifies a domain in which a user account is located, having, for example, a format of someone@example.com (as may be the case with an email address). At 138, the security agent 102 may also determine a session ID based at least in part on the PID of the process 126. For instance, the security agent 102 may lookup the PID of the process 126 in the PID mapping information 130 to determine the user account ID of the user who owns the process 126, and to determine the session ID of the user session 118(2) in which the process 126 was launched/created.

At 140, the security agent 102 may call an authentication function using the user account ID determined at 136. The security agent 102 may call the authentication function because the security agent 102 may not be executing inside of the context of the user session 118(2) when it is time to obtain the user token 110. Accordingly, the authentication function may be a mechanism used by the security agent 102 to obtain the user token 110 even though it receives the request from the anti-malware component 106 outside of the operation of the user session 118(2). In some implementations, the authentication function called at 140 may comprise a LsaLogonUser function, which is configured to authenticate a security principal's logon data by using stored credentials information. In other implementations, the authentication function called at 140 may comprise a LsaLogonUserEx function, or a direct Remote Procedure Call to Local Security Authority Subsystem Service. If the authentication is successful, this authentication function, among other things, may return a user token 110 for the user and/or the user session 118(2) associated with the user account ID determined at 136. The LsaLogonUser function includes a LsaHandle parameter to request an impersonation token (e.g., the user token 110) using a data structure called a "service for users (S4U)" data structure (e.g., KERB_S4U_LOGON). This S4U data structure contains information about a S4U logon, and may be used by the authentication function (e.g., the LsaLogonUser function) with a Kerberos package in a Windows OS for requesting the user token 110 as an impersonation token. The S4U data structure may specify a UPN of a client. In this case, the S4U data structure used by the authentication function may specify the user account ID (e.g., UPN) associated with the user session 118(2) where the malicious file 122(2) was detected.

The authentication function may return, at 142, the user token 110 to the security agent 102, as illustrated in FIG. 1. After receiving the user token at 142, the security agent 102 may, at 144, provide the user token 110 and the session ID to the anti-malware component 106. Recall that the session ID may have been determined based on the PID of the process 126 at 138.

Upon receiving the user token 110 and the session ID from the security agent 102, the anti-malware component 106 may, at 146, use the user token 110 as an impersonation token to request a pointer to a COM interface for outputting a notification in the context of the user session 118(2). "Component Object Model (COM)" is a platform-independent, distributed, object-oriented system for creating binary software components that can interact. COM is a binary standard (i.e., a standard that applies after a program has been translated to binary machine code) developed by Microsoft Corporation® of Redmond, Wash. COM specifies an object model and programming requirements that enable "COM objects" (also called "COM components," or sometimes simply "objects") to interact with other objects. These objects can be within a single process, in other processes, and can even be on remote computers. COM objects can be written in different languages that create structures of pointers and, explicitly or implicitly, call functions through pointers. Object-oriented languages including, without limitation, C++ and Smalltalk can be used to implement COM objects.

Access to a COM object's data may be provided through one or more sets of related functions. These function sets are called "COM interfaces," and the functions of a COM interface are called "methods." Accordingly, a COM interface refers to a predefined group of related functions that a COM class implements, but a specific COM interface does not necessarily represent all of the functions that the class supports. An object "implementing an interface" means that the object uses code that implements each method of the interface and provides COM binary-compliant pointers to those functions to the COM library. COM then makes those functions available to any client (e.g., the anti-malware component 106) who asks for a pointer to the COM interface, whether the client is inside or outside of the process that implements those functions. Thus, COM enables the provisioning of user notifications outside of processes.

The COM interface requested by the anti-malware component 106 at 146 may comprise an IUserNotification interface, an IUserNotificationX interface (where "X" is any value), or any other suitable COM interface, such as a custom COM interface that may be used as a proxy to call an IUserNotificationX COM interface. The IUserNotification COM interface, in particular, exposes methods that set notification information and then provide (e.g., display) that notification to the user associated with the appropriate user session 118, such as in a balloon that appears in conjunction with the notification area of the taskbar. The IUserNotification COM interface has the following methods:

| Method | Description |
| --- | --- |
| PlaySound | Plays a sound in conjunction with the notification |
| SetBalloonInfo | Sets the information to be displayed in a balloon notification |
| SetBalloonRetry | Specifies the conditions for trying to display user information when the first attempt fails |
| SetIconInfo | Sets the notification area icon associated with specific user information |
| Show | Displays the notification |

Thus, when the COM interface is used to provide the notification, output of the notification is not limited to displaying the notification on a display of the computing device. For instance, the notification may additionally, or alternatively, be output audibly via a speaker(s) of the computing device in the context of the user session 118(2).

At 146, the anti-malware component 146 may also use the session ID it received from the security agent 102 in making its request for the pointer to the COM interface (e.g., the IUserNotification COM interface). This may be done with something called a "moniker." A "moniker," in COM, can be used to identify an object, and/or it can be implemented as an object itself. The moniker may allow a component to obtain a pointer to the object identified by the moniker; a process referred to as "binding." In this case, the anti-malware component 106 may use a moniker to get a pointer to the IUserNotification COM interface to cause a notification to be output in the desired user session 118, which, in this case, is the second user session 118(2) corresponding to the session ID it received from the security agent 102. If the anti-malware component 106 attempted to request the pointer to the COM interface without using the moniker to specify the session ID, the user notification may be provided in the session associated with the anti-malware component 106, which, as noted above, may be a services session (e.g., Session 0), that does not provide user interface functionality. Thus, the moniker specifying the session ID may be used to provide the user notification in the user session 118(2). Example pseudo-code that can be used for this purpose may include the following code: session:2:new!{GUID}. Here, "GUID" represents the globally unique identifier (GUID) for the IUserNotification COM interface. In some implementations, a custom GUID may be registered and associated with a custom user mode process under the session/moniker. In this scenario, when a COM component is spawned, the operating system may create the custom user mode process (if one isn't already running) under the user account and session specified by the user token 110 and moniker. In this way, the notification's title may be read from a resource file of the custom user mode process. Thus, the techniques and systems described herein may instantiate any suitable COM class inside of any suitable moniker to display a notification. In some implementations, requesting the pointer to the IUserNotification COM interface at 146 may include using a "CoGetObject" function, which converts a display name into a moniker that identifies the object named, and then binds to the object identified by the moniker.

In response to requesting the pointer of the COM interface at 146, the anti-malware component 106 may receive the pointer to COM interface, represented by a COM server 148(2) associated with the user session 118(2); the session 118(2) in which the malicious file 122(2) was detected. With this pointer, the anti-malware component 106 may call a method(s) of the COM interface of the COM server 148(2) to provide a user notification in context of the user session 118(2). Accordingly, at 150, a method of the COM interface, when called, may cause a notification to be output via an output device (e.g., a display and/or speaker(s), etc.) of the computing device in context of the user session 118(2). The notification output at 150 may indicate, to a user, that the security action was performed. In this manner, the user is provided an explanation for being unable to open the file 122(2), for instance, when the security action blocks the opening of the file 122(2), or for being unable to save the file 122(2) to disk when the security action quarantines the file, and so on.

Notably, the user notification provisioning techniques shown in FIG. 1 allow the computing device to remain secure (due to executing the anti-malware component 106, and its associated scanners 120, with low privileges (e.g., less-than Admin privileges). The computing device can also operate efficiently without a significant performance impact because the anti-malware component 106 implements a COM interface, in lieu of creating a user mode process, to provide the user notification. This performance efficiency can be realized in instances where many users are logged into many corresponding user sessions 118, and in the scenario where many malicious files 122 are detected.

It is to be appreciated that FIG. 1 illustrates an example where a security action is taken at 134 on behalf of a process 126 associated with a particular user session, and as such, the security agent 102 may, at 136, determine a user account ID based at least in part on the PID of the process 126. However, this is a non-limiting example of a process-initiated event that triggers the security action at 134, whereas other types of non-process-initiated events may trigger the security action at 134. In these situations, a user may be identified, and a session ID may be determined, in other ways besides using the PID of a process.

For example, an event triggering the security action at 134 may include a user inserting a universal serial bus (USB) device into the computer, and the security action may block other actions associated with that event for security purposes. In this example, there may not be a PID that can be used to identify the user who is to be provided the notification. In this case, a "currently logged on user" can be identified, or, if there are multiple users, a "currently logged on user in the console session" can be identified, and the session ID associated with such a user can be determined.

In another example, a process may take an action itself, and the process may still be running at the time the security action is to be taken at 134, in which case, the security agent 102 may request the session ID from the operating system, or consult an internal mapping for the session ID.

In yet another example, a process may take an action itself, but the process has exited by the time the security action is to be taken at 134, in which case, the security agent 102 may consult an internal mapping for the session ID.

In yet another example, an event triggering the security action at 134 is not associated with a process, and a user who is to be provided a notification may not be known to the system. For instance, something may have happened in the kernel, or, for example, a malicious network packet may have been received. In this case, a "currently logged on user" can be identified, or, if there are multiple users, a "currently logged on user in the console session" can be identified, and the session ID associated with such a user can be determined.

FIG. 2 illustrates a component level view of a computing device 200 configured with a security agent and an anti-malware component to implement the techniques described herein for securely and efficiently providing user notifications. As illustrated, computing device 200 comprises a memory 202 storing an OS kernel 204, a security agent 206 (to be executed in kernel mode), an anti-malware component 208 (to be executed in user mode and associated with one or more scanners 210), user tokens 212 associated with user sessions 118, and processes and data 214. Also, computing device 200 includes a processor(s) 216, removable storage 218 and non-removable storage 220, input device(s) 222, output device(s) 224, and communication connections 226 for communicating with other computing devices 228.

In various embodiments, memory 202 is volatile (such as RAM), non-volatile (such as ROM, flash memory, etc.) or some combination of the two. The OS kernel 204 may be a kernel of any sort of OS, such as the OS kernel 112 described above in detail with respect to FIG. 1. The security agent 206 may be an example of the security agent 102 described above in detail with respect to FIG. 1. The anti-malware component 208 may be an example of the anti-malware component 106 described above in detail with respect to FIG. 1. The scanner(s) 210 may be an example of the scanner(s) 120 described above in detail with respect to FIG. 1. The user tokens 212 may be an example of the user tokens 110 described above in detail with respect to FIG. 1. The processes and data 214 may include, without limitation, the process 126, the PID mapping information 130, the files 122, and the like, which were described above in detail with respect to FIG. 1. The processor(s) 216 may be an example of the processor(s) 116 described above in detail with respect to FIG. 1.

Computing device 200 also includes additional data storage devices (removable and/or non-removable) such as, for example, magnetic disks, optical disks, or tape. Such additional storage is illustrated in FIG. 2 by removable storage 218 and non-removable storage 220. Non-transitory computer-readable media may include volatile and nonvolatile, removable and non-removable tangible, physical media implemented in technology for storage of information, such as computer readable instructions, data structures, program modules, or other data. System memory 202, removable storage 218 and non-removable storage 220 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the computing device 200. Any such non-transitory computer-readable media may be part of the computing device 200.

As mentioned, computing device 200 has input device(s) 222, such as a keyboard, a mouse, a touch-sensitive display, voice input device, etc., and output device(s) 224, such as a display, speakers, a printer, etc. For example, the output device(s) 224 may include a display for displaying visual user notifications about security actions taken with respect to malicious files, and/or a speaker(s) for outputting audible user notifications about the security actions. These devices are well known in the art and need not be discussed at length here.

Computing device 200 also contains communication connections 226 that allow the computing device 200 to communicate with other computing devices 228.

EXAMPLE PROCESSES

These processes described herein are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 3:
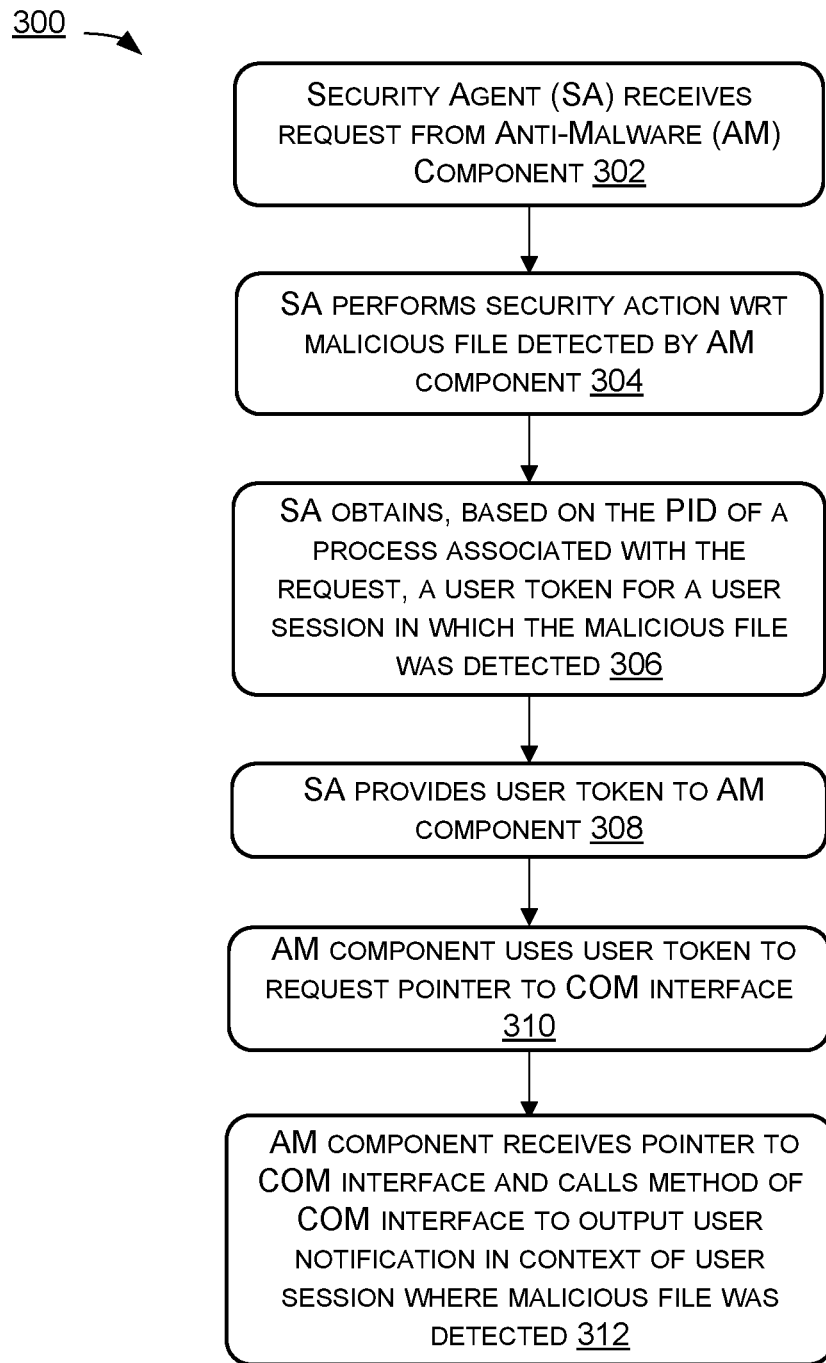
FIG. 3 illustrates an example process for securely and efficiently providing user notifications about security actions performed with respect to malicious files detected on a computing device.

FIG. 3 illustrates an example process 300 for securely and efficiently providing user notifications about security actions performed with respect to malicious files detected on a computing device. The process 300 includes, at 302, a security agent 102/206 receiving a request from an anti-malware component 106/208. The security agent 102/206 may execute in kernel mode 104 of the computing device, while the anti-malware component 106/208 may execute (e.g., with low privileges) in user mode 108 of the computing device. The request received at 302 may request that the security agent 102 perform a security action with respect to a malicious file 122(2) detected by an anti-malware scanner 120(2)/210 associated with the anti-malware component 106/208.

At 304, the security agent 102/206 may perform a security action with respect to a malicious file 122(2) detected on the computing device by the anti-malware component 106/208.

At 306, the security agent 102/206 may obtain, (e.g., based at least in part on a process identifier (PID) of a process 126 associated with the request from anti-malware component 106/208), a user token 110 associated with a user session 118(2) in which the malicious file 122(2) was detected. In some implementations, the security agent 102/206 may, at 306, call an authentication function which returns the user token 110.

At 308, the security agent 102/206 may provide the user token 110 to the anti-malware component 106/208.

At 310, the anti-malware component 106/208 may use the user token 110 it received from the security agent 102/206 to request a pointer to a COM interface (e.g., represented by the COM server 148(2)) for outputting a notification in context of the user session 118(2).

At 312, the anti-malware component 106/208 may receive the pointer to the COM interface and call a method of the COM interface to cause a user notification to be output via an output device of the computing device. The user notification output at 312 may indicate that the security action was performed.

Figure 4A:
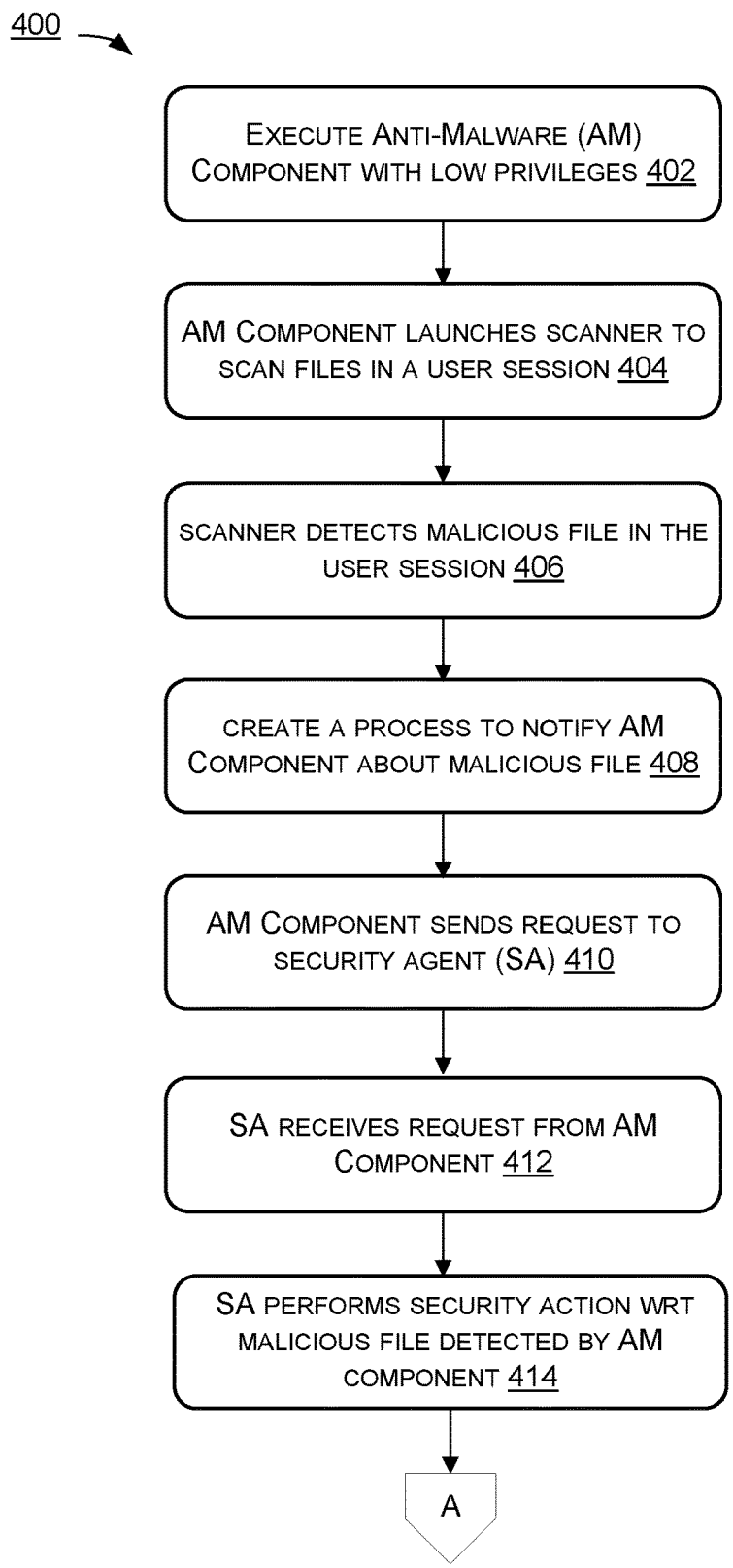
FIGS. 4A and 4B illustrate a more detailed example process for securely and efficiently providing user notifications about security actions performed with respect to malicious files detected on a computing device.
Figure 4B:
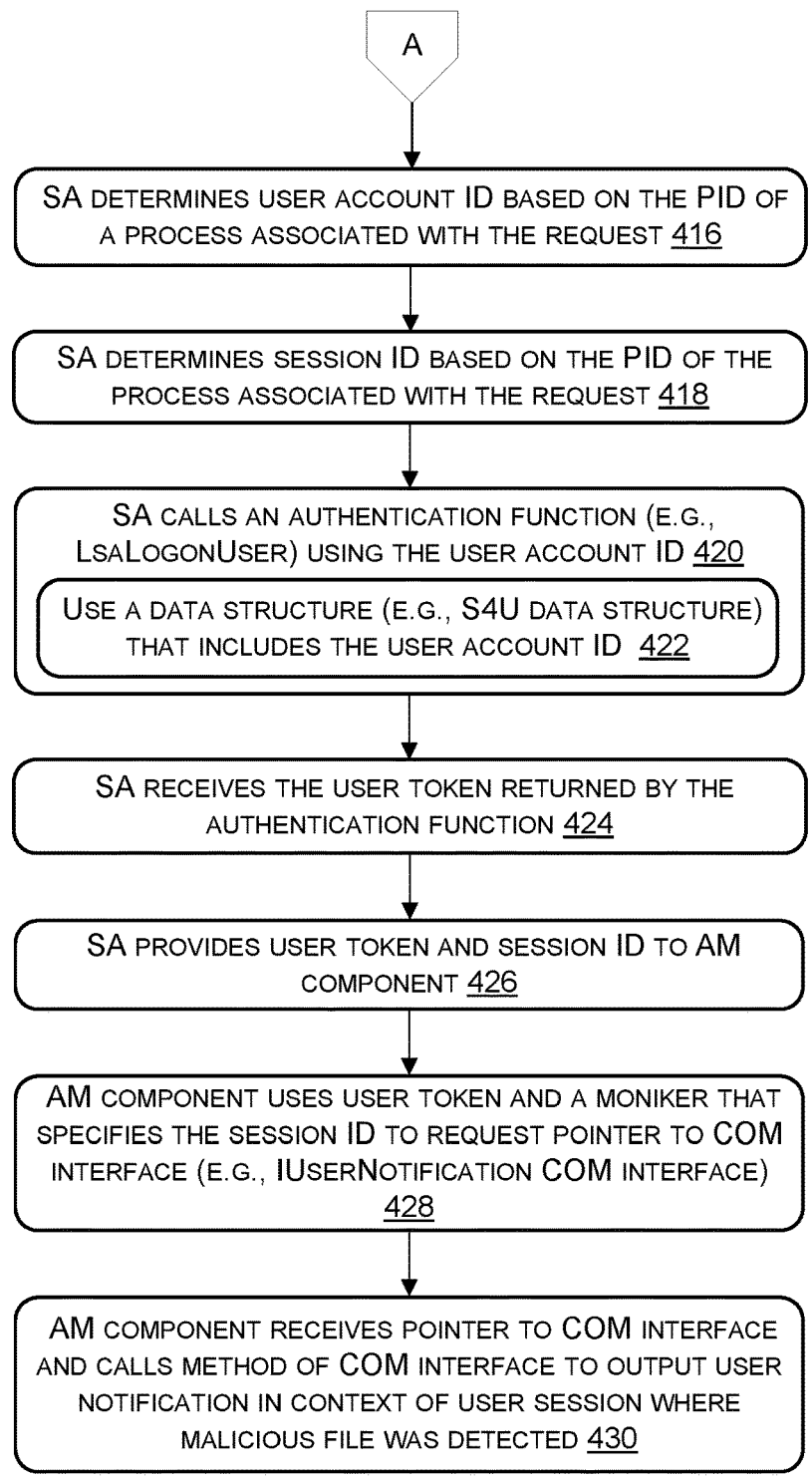

FIG. 4 illustrates a more detailed example process 400 for securely and efficiently providing user notifications about security actions performed with respect to malicious files detected on a computing device. The process 400 includes, at 402, executing an anti-malware component 106/208 in user mode 108 of a computing device with low privileges (e.g., privileges that are more restrictive than Administrator (Admin) privileges).

At 404, the anti-malware component 106/208 may launch a scanner 120(2) in user mode 108 to scan files in a user session 118(2) on the computing device.

At 406, the scanner 120(2) may detect a malicious file 122(2) in the user session 118(2). For example, a user of the user session 118(2) may try to access/open the file 122(2) or save the file 122(2) to disk, and the scanner 120(2) may scan the file 122(2) and may detect malware based on a signature/fingerprint database lookup, or a similar technique.

At 408, a user mode process 126 may be created in the user session 118(2) to notify the anti-malware component 106/208 about the detected malicious file 122(2). This process 126 may be assigned a PID upon its creation, and this PID may be maintained in PID mapping information 130, which associates the PID with a user account ID and a session ID associated with the user session 118(2) in which the process 126 was created.

At 410, the anti-malware component 106/208 may send a request to the security agent 102/206 that pertains to the detected malicious file 122(2). This request may request that the security agent 102/206 perform a security action with respect to the malicious file 122(2).

At 412, the security agent 102/206 may receive the request from the anti-malware component 106/208.

At 414, the security agent 102/206 may perform a security action with respect to a malicious file 122(2) detected on the computing device by the anti-malware component 106/208.

At 416, the security agent 102/206 may determine a user account ID based at least in part on the PID of the process 126 associated with the request received at 412. In some implementations, the user account ID may include a UPN.

At 418, the security agent 102/206 may determine a session ID based at least in part on the PID of the process 126 associated with the request received at 412.

At 420, the security agent 102/206 may call an authentication function using the user account ID. In some implementations, the authentication function may include a LsaLogonUser function. At 422, a data structure may be used with the authentication function that is called at 420, the data structure including the user account ID determined at 416. In some implementations, the data structure is a S4U data structure that includes a UPN determined at 416.

At 424, the security agent 102/206 may receive a user token 110 returned by the authentication function.

At 426, the security agent 102/206 may provide the user token 110 and the session ID to the anti-malware component 106/208.

At 428, the anti-malware component 106/208 may use the user token 110 it received from the security agent 102/206 as an impersonation token to request a pointer to a COM interface (e.g., represented by the COM server 148(2)). At 428, the anti-malware component 106/208 may use a moniker that specifies the session ID of the user session 118(2) in order to request the pointer to the COM interface (e.g., an IUserNotification COM interface).

At 430, the anti-malware component 106/208 may receive the pointer to the COM interface and may call a method of the COM interface to cause output of a user notification indicating that the security action was performed. The output device via which the user notification is output may include a display of the computing device, a speaker(s) of the computing device, or a combination thereof. For example, the user notification may be output at 430 may displaying the notification on the display of the computing device, and/or audibly outputting the notification via the speaker.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
performing, by a software security agent executing in kernel mode of a computing device, a security action with respect to a malicious data object or a malicious activity detected on the computing device;
providing, by the software security agent, to one or more user mode components, a token associated with a user session in which the malicious data object or the malicious activity was detected;
receiving, by the one or more user mode components, based at least in part on the token, a pointer to one or more Component Object Model (COM) interfaces; and
outputting, via an output device of the computing device, and using the pointer to the one or more COM interfaces, a notification to indicate that the security action was performed.

2. The method of claim 1, further comprising, prior to the providing of the token to the one or more user mode components:
determining, by the software security agent, a user account name or identifier (ID);
calling, by the software security agent, an authentication function using the user account name or ID; and
receiving, by the software security agent, the token returned by the authentication function.

3. The method of claim 1, wherein the notification is output in context of the user session.

4. The method of claim 1, wherein the outputting comprises calling a method of the one or more COM interfaces.

5. The method of claim 1, further comprising requesting, by the one or more user mode components, the pointer to the one or more COM interfaces using, by the one or more user mode components, a moniker that specifies a session identifier (ID) of the user session.

6. The method of claim 1, wherein the malicious data object comprises a malicious file, or wherein the malicious activity is performed based on data contained within a file.

7. The method of claim 1, wherein the output device comprises at least one of a display or a speaker.

8. A computing device comprising:
an output device;
a processor; and
memory storing computer-executable instructions that, when executed by the processor, cause the processor to:
execute a software security agent in kernel mode of the computing device to:
perform a security action with respect to a malicious data object or a malicious activity detected on the computing device; and
provide a token to one or more user mode components, the token associated with a user session in which the malicious data object or the malicious activity was detected;
execute the one or more user mode components to receive, based at least in part on the token, a pointer to one or more Component Object Model (COM) interfaces; and
output a notification via the output device and using the pointer to the one or more COM interfaces, the notification indicating that the security action was performed.

9. The computing device of claim 8, wherein the computer-executable instructions, when executed by the processor, further cause the processor to execute the one or more user mode components to request the pointer to the one or more COM interfaces using a moniker that specifies a session identifier (ID) of the user session.

10. The computing device of claim 8, wherein the computer-executable instructions, when executed by the processor, further cause the processor to execute the software security agent to:
determine a user account name or identifier (ID);
call an authentication function using the user account name or ID; and
receive the token returned by the authentication function.

11. The computing device of claim 8, wherein the notification is output in context of the user session.

12. The computing device of claim 8, wherein the malicious data object comprises a malicious file, or wherein the malicious activity is performed based on data contained within a file.

13. The computing device of claim 8, wherein the output device comprises at least one of a display or a speaker.

14. A non-transitory computer-readable medium storing computer-executable instructions that, when executed by one or more processors of a computing device, cause the computing device to:
execute a software security agent in kernel mode of the computing device to:
perform a security action with respect to a malicious data object or a malicious activity detected on the computing device; and
provide a token to one or more user mode components, the token associated with a user session in which the malicious data object or the malicious activity was detected;
execute the one or more user mode components to receive, based at least in part on the token, a pointer to one or more Component Object Model (COM) interfaces; and
output a notification via an output device of the computing device and using the pointer to the one or more COM interfaces, the notification indicating that the security action was performed.

15. The non-transitory computer-readable medium of claim 14, wherein the computer-executable instructions, when executed by the one or more processors, further cause the computing device to execute the software security agent to:
determine a user account name or identifier (ID) of a user who is currently logged into the user session; and
obtain the token based at least in part on the user account name or ID.

16. The non-transitory computer-readable medium of claim 14, wherein the computer-executable instructions, when executed by the one or more processors, further cause the computing device to execute the one or more user mode components to request the pointer to the one or more COM interfaces using a moniker that specifies a session identifier (ID) of the user session.

17. The non-transitory computer-readable medium of claim 14, wherein outputting the notification comprises calling a method of the one or more COM interfaces.

18. The non-transitory computer-readable medium of claim 14, wherein the notification is output in context of the user session.

19. The non-transitory computer-readable medium of claim 14, wherein the computer-executable instructions, when executed by the one or more processors, further cause the computing device to execute the software security agent to:
determine a user account name or identifier (ID);
call an authentication function using the user account name or ID; and
receive the token returned by the authentication function.

20. The non-transitory computer-readable medium of claim 14, wherein the malicious data object comprises a malicious file, or wherein the malicious activity is performed based on data contained within a file.

* * * * *